United States Patent Office 3,287,402
Patented Nov. 22, 1966

3,287,402
SYNTHESIS OF VINYL ESTERS IN THE PRESENCE OF A CRYSTALLINE ALUMINOSILICATE CATALYST
Phillip S. Landis, Woodbury, N.J., assignor to Mobil Oil Corporation, a corporation of New York
No Drawing. Filed May 25, 1964, Ser. No. 370,053
7 Claims. (Cl. 260—498)

This invention relates to the synthesis of vinyl esters by the vinylation of acids, and more particularly to a method for producing vinyl esters in the presence of novel catalyst compositions.

A considerable number of materials have been heretofore proposed as catalysts for synthesizing vinyl esters from acetylene and appropriate acids in either a liquid or vapor phase operation. In a vapor phase operation, acetylene and acid are passed through a suitably heated reactor and contactor with catalysts such as zinc or cadmium salts of carboxylic acids, mercury salts, e.g., mercuric chloride or mercury acetate, zinc or cadmium chromites, and silicates of zinc and cadmium. Catalysts of this type as well as others have also been employed in conjunction with carriers such as activated carbon, alumina, silica gel, and the like. The preparation of vinyl esters in a liquid phase operation is generally accomplished by reacting acetylene and acid at elevated temperatures and pressures in the presence of mercury compounds or compounds of iron, copper, aluminum and magnesium. The synthesis of vinyl ester monomers by the interaction of acetylene and acid is important economically for providing compounds which find extensive utility as intermediates in the preparation of paints, plasticizers, coating compositions, adhesives, resins, and the like.

Accordingly, it is an object of this invention to provide a novel catalyst for the synthesis of vinyl esters from acetylene and acid.

Another object of the invention is to produce vinyl acetate by catalyzing the reaction of acetylene and acetic acid.

Other objects of the invention are apparent from the following description.

In accordance with the present invention it has been discovered that crystalline aluminosilicates can be effectively employed as catalysts for the synthesis of vinyl esters by the interaction of acetylene and appropriate acids. The catalyst compositions may be exemplified in simplification by reference to the following general formula:

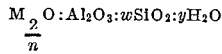

in which M represents a cation of a metal selected from the group consisting of iron, magnesium, zinc, nickel, cadmium, copper, and mercury having a valence of $n$; $w$ is a number of 1.0 to 10 or greater representing the average ratio of silica to alumina; and $y$ is a number of 0 to 10 representing the moles of water per mole weight of $Al_2O_3$. Within the scope of the above formula a preferred embodiment is directed to crystalline aluminosilicates having a high silica to alumina ratio, i.e., $w$ equals 3.0 or greater, wherein the aluminosilicate contains at least 0.5 equivalent, preferably 0.9+0.1 equivalent, of metal (M) per gram atom of aluminum. The catalyst compositions used in accordance with the invention are essentially stable, can be used in small concentrations, generally introduce no troublesome preparation problems, and permit the vinylation of acids to be carried out under practicable and controllable rates.

The catalyst compositions are preferably prepared by treating a suitable precursor aluminosilicate with an aqueous solution of an ionizable compound of iron, magnesium, zinc, nickel, cadmium, copper of mercury for a period of time sufficient to bring about the extent of desired introduction of such ion or mixtures thereof. In general, the pH value of the fluid medium will range from 4.0 to 10.0 and is preferably within the range of 4.5 to 8.5. The extent to which exchange takes place can be controlled so that the metallic ions originally associated with the precursor material, e.g., alkali metals, are either totally replaced or partially replaced with the desired ions in a proportion of less than 5 percent up to 100 percent. In most instances it is preferred that the aluminosilicate contain less than about 0.25 equivalent of alkali per gram atom of aluminum. Effective treatment with the fluid medium to obtain the corresponding metal analog will vary with the duration of the treatment and temperature at which it is carried out. Such treatments also are governed by equilibrium considerations. Elevated temperatures tend to hasten the speed of treatment whereas the duration thereof varies inversely with the metal ion concentration of the fluid medium. In general, the temperatures employed range from below ambient room temperatures of 24° C. up to temperatures below the decomposition temperatures of the aluminosilicate. Following the base exchange treatment, the resulting aluminosilicate is washed with water, preferably distilled water, until the effluent wash water has a pH value of wash water, i.e., between about 4.0 and 8.0. The aluminosilicate is thereafter dried to remove the liquid water phase, and preferably activated by heating at temperatures ranging from about 400° F. to 1500° F.

The actual procedure employed for carrying out the fluid treatment of the aluminosilicate may be accomplished in a batch-wise or continuous method under atmospheric, subatmospheric, or superatmospheric pressure. A solution, of the desired ion, in the form of a molten material, vapor, aqueous or non-aqueous solution, may be passed slowly through a fixed bed of the aluminosilicate precursor material. If desired, hydrothermal treatment or a corresponding non-aqueous treatment, with polar solvents may be effected by introducing the aluminosilicate and solution of ionizable metal compound into a closed vessel maintained under autogenous pressure.

Representative metal compounds which can be employed as a source of ions include inorganic and organic salts of iron, magnesium, zinc, nickel, cadmium, copper and mercury. The preferred salts are the chlorides, nitrates, acetates and sulfates.

The metal aluminosilicate precursor materials include a wide variety of natural and synthetic aluminosilicates which may be represented in their hydrated form by the formula:

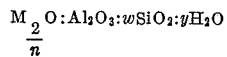

wherein M is a metal cation, $n$ represents the valence of the cation, $w$ is a number representing the average moles of silica, and $y$ the moles of water per mole of $Al_2O_3$. The cation may be any one or more of a number of metal ions. The aluminosilicate may be synthesized or it may occur naturally. Typical cations include sodium, lithium, potassium, silver, magnesium, calcium, zinc and barium. The mole ratio of silica to alumina ($w$) in these compositions may vary depending upon whether the aluminosilicate is a natural material, such as mordenite, chabazite, gmelinite or ptilolite, or on the method by which it is synthesized. The main characteristic of these materials is the presence in their molecular structure of at least 0.5 equivalent and usually 0.9±0.1 equivalent of an ion of positive valence per gram atom of aluminum and an ability to undergo dehydration without substantially affecting the spatial arrangement of inorganic oxides within their dimensional framework.

Typical precursor materials may be chosen from the known synthesized crystalline aluminosilicates which have been designated as Zeolites X, A, Y, L, D, R, S, T, Z, E, F, Q, and B.

Other synthesized crystalline aluminosilicates include those designated as ZK–4 and ZK–5.

ZK–4 can be represented in terms of mole ratios of oxides as:

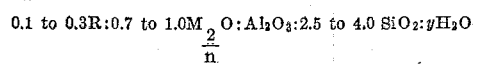
$$0.1 \text{ to } 0.3R : 0.7 \text{ to } 1.0 M_{\frac{2}{n}} O : Al_2O_3 : 2.5 \text{ to } 4.0\ SiO_2 : yH_2O$$

wherein R is a member selected from the group consisting of methylammonium oxide, hydrogen oxide and mixtures thereof with one another, M is a metal cation having a valence of $n$, and $y$ is any value from about 3.5 to 5.5.

ZK–5 can be represented in terms of mole ratios of oxides as:

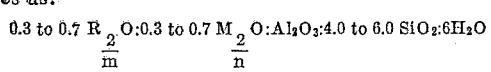
$$0.3 \text{ to } 0.7\ R_{\frac{2}{m}} O : 0.3 \text{ to } 0.7\ M_{\frac{2}{n}} O : Al_2O_3 : 4.0 \text{ to } 6.0\ SiO_2 : 6H_2O$$

wherein R is selected from the group consisting of a nitrogen-containing cation derived from N,N'-dimethyltriethylene diammonium ion and mixtures of said cation with hydrogen, and $m$ is the valence thereof; M is a metal and $n$ the valence thereof, and $y$ is any value from 6 to about 10.

Among the naturally occurring crystalline aluminosilicates which can be employed for purposes of the invention are included faujasite, heulandite, clinoptilolite, chabazite, gmelinite, mordenite, dachiardite, and erionite.

Other aluminosilicates which can be used as precursor materials are caustic treated clays.

It is to be understood that, although reference has been made to aluminosilicates as precursor materials, it is intended to include other materials which have an analogous structure to aluminosilicates resulting from isomorphous substitution of some or all of the atoms of aluminum or silicon with other elements, e.g., substitution of germanium for silicon and/or gallium for aluminum.

Preferred crystalline aluminosilicates for use in accordance with the invention have ratios of silica to alumina of about 3.0 or greater, and preferably greater than about 4.0. Preferred materials are thus derived from precursor aluminosilicates such as mordenite and zeolites X, Y, T and XK–5. These and other useful aluminosilicates are further characterized by their sorption capacity of at least about 4 weight percent normal butane at 760 mm. at 25° C.

The acids which are reacted with acetylene include aliphatic carboxylic acids such as acetic acid, propionic acid, butyric acid, valeric acid, caproic acid, lauric acid, palmitic acid, margaric acid, stearic acid, oleic acid, adipic acid, myristic acid, sebacic acid, etc.; aromatic carboxylic acids such as the toluic acids, benzoic acid, abietic acid, naphthoic acids, phthalic acids, etc., and mixed aliphatic-aromatic acids such as phenyl acetic acid, cinnamic acid, phenylglycine, and the like. The acids may be pure or partially esterified such as the acid esters of phthalic acid, e.g., the monoalkyl esters such as the monoethyl and monobutyl esters. Further included are mixtures of acids obtainable by oxidizing paraffin or Montan wax, or mixtures obtainable by saponifying natural fats and fatty oils containing esters and/or fatty acids.

The vinylation reaction is successfully carried out with the catalyst compositions in either a liquid phase operation at temperatures of about 120° to 300° C. under a pressure of 5 to 20 0atmospheres or in a vapor phase reaction under conditions well known in the art.

In general it is preferred to carry out the reaction of aceylene and acid in the gaseous phase at temperatures of at least 150° C. up to temperatures just below the decomposition temperature of the particular acid employed. The upper temperature limit is governed by thermal stability of the compounds involved and in general will be below about 400° C. and preferably within the range of 180° to 300° C. The reaction is carried out at atmospheric or superatmospheric pressure by introducing a vapor mixture of acetylene and acid into a suitably heated reactor tube which contains the crystalline aluminosilicate catalyst. The vapors react to form the corresponding vinyl ester of the carboxylic acid and the reaction products, comprising vinyl ester, acetylene and unreacted acid, are condensed to recover the vinyl ester and acid which are thereafter separated by fractionation, for example, to obtain the pure vinyl ester monomer. If desired, the reaction may be carried out in the presence of an entrainer which forms an azeotropical mixture with the acid undergoing vinylation. The vinyl ester is then recovered by distillation leaving as a distillation residue a mixture of entrainer and unreacted acid. Suitable entrainers include aliphatic, cycloaliphatic, aromatic and alkyl aromatic hydrocarbons which are substantially inert under the reaction conditions and which have boiling points at atmospheric pressure of at least 10° C. above the boiling point of the vinyl ester.

The mol ratios of acetylene and acid may vary widely from equimolecular proportions to an excess of either reactant. It is preferred to operate at an acetylene to acid molar ratio of at least 4 to 1. With high molecular weight acids the acetylene acid mol ratios preferably vary from 20:1 to 30:1. Variations in the mol ratios may also be utilized to obtain, if desired, ethylidene diesters.

The amount of catalyst employed is not critical and may vary widely. For liquid phase operations the amount of catalyst employed will range from about 0.1 to 10% by weight, usually about 0.5 to 5%, based on the total weight of the acid employed.

The synthesis of vinyl esters may be carried out in a batchwise or continuous manner in any apparatus commonly employed for such operations. Polymerization inhibitors of a phenolic nature, such as hydroquinone, pyrocathechol, 2-methylhydroquinone, etc., likewise may be employed.

The following examples illustrate the best mode now contemplated for carrying out the invention.

*Example 1*

A synthetic crystalline aluminosilicate of the faujasite structure was calcined for four hours at 850° F. The resulting product was subjected to 5 two-hour treatments with an aqueous solution containing 12.0 wt. percent of $MgCl_2$. The resulting aluminosilicate composition was thereafter washed, dried in an oven at 230° F. and calcined for four hours at 850° F. The final product analyzed 4.0 wt. percent Na.

*Example 2*

A synthetic crystalline aluminosilicate of the faujasite structure having a $SiO_2$ to $Al_2O_3$ ratio of about 4.0, was calcined for four hours at 850° F. The resulting product was subjected to 5 two-hour treatments with an aqueous solution containing 17.2 wt. percent of $ZnCl_2$. The resulting aluminosilicate composition was thereafter washed, dried in an oven at 230° F. and calcined for four hours at 850° F. The final product analyzed 3.9 wt. percent Na.

*Example 3*

A synthetic crystalline aluminosilicate of the faujasite structure, having a $SiO_2$ to $Al_2O_3$ ratio of about 3.0, was calcined for four hours at 850° F. The resulting product was subjected to 3 two-hour treatments with an aqueous solution containing 28.8 wt. percent of $CdCl_2 \cdot 2.5H_2O$. The resulting aluminosilicate composition was thereafter washed, dried in an oven at 230° F. and calcined for four hours at 850° F. The final product analyzed 3.6 wt. percent Na.

*Example 4*

A synthetic crystalline aluminosilicate of the faujasite structure was calcined for four hours at 850° F. The resulting product was subjected to 9 two-hour treatments with an aqueous saturated solution of $HgCl_2$. The resulting aluminosilicate composition was thereafter washed, dried in an oven at 230° F. and calcined for four hours at 850° F.

*Example 5*

A synthetic crystalline aluminosilicate of the faujasite structure was calcined for four hours at 850° F. The resulting product was subjected to 4 two-hour treatments with an aqueous solution containing 29.9 wt. percent of $NiCl_2 \cdot 6H_2O$. The resulting aluminosilicate composition was thereafter washed, dried in an oven at 230° F. and calcined for four hours at 850° F. The final product was analyzed 3.8 wt. percent Na.

*Example 6*

A synthetic crystalline aluminosilictate of the faujasite structure was calcined for four hours at 850° F. The resulting product was subjected to 3 two-hour treatments with an aqueous solution containing 29.95 wt. percent of $CuCl_2 \cdot 6H_2O$. The resulting aluminosilicate composition was thereafter washed, dried in an oven at 230° F. and calcined for four hours at 850° F. The final product analyzed 2.0 wt. percent Na.

*Example 7*

A synthetic crystalline aluminosilicate of the faujasite structure, having a molecular composition of approximately $Na_2O \cdot Al_2O_3 \cdot 2.5 \pm 0.5 SiO_2$, was calcined for four hours at 850° F. The resulting product was subjected to 3 two-hour treatments with an aqueous solution containing 13.52 wt. percent of $FeCl_3$. The resulting aluminosilicate composition was thereafter washed, dried in an oven at 230° F. and calcined for four hours at 850° F. The final product analyzed 3.2 wt. percent Na.

*Example 8*

A reactor tube having a length of about 3 feet and a diameter of 1½ inches is packed with the zinc aluminosilicate prepared in Example 2. About 50 grams of acetic acid in the form of vapor together with a six molar excess of acetylene per hour are passed through the tube at a temperature of about 230° C. The yield of vinyl acetate amounts to about 75% based on the acetic acid.

*Example 9*

Vinyl laurate is prepared by vaporizing lauric acid and admixing acetylene therewith in a molar ratio of 12 to 1. The mixture is introduced into the reactor tube which is packed with the cadmium aluminosilicate prepared in Example 3. The reaction temperature in the tube is maintained between 220 and 230° C. The reaction vapor exiting from the reactor tube is condensed and the crude vinyl laurate ester recovered and further purified by distillation.

*Example 10*

In a manner similar to that described in Example 1, 50 grams of acetic acid in the form of vapor together with a six molar excess of acetylene are passed over the nickel aluminosilicate prepared in Example 5. The vinyl acetate is recovered in good yield.

What is claimed is:

1. In a method for the production of vinyl esters by the reaction of acetylene with a carboxylic acid, the improvement which comprises carrying out the reaction in the presence of a catalyst composition comprising a crystalline aluminosilicate having the formula:

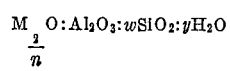

in which M represents a cation of a metal selected from the group consisting of iron, magnesium, zinc, nickel, cadmium, copper and mercury having a valence of $n$; $w$ is a number of 1 to 10; and $y$ is a number of 0 to 10 representing the moles of water per mole of $Al_2O_3$.

2. The method of claim 1 wherein the aluminosilicate is faujasite.

3. The method of claim 1 wherein the aluminosilicate contains less than about 10% by weight sodium.

4. The method of claim 1 wherein the aluminosilicate has a silica to alumina ratio of at least about 3.0.

5. The method of claim 1 wherein the aluminosilicate has a silica to alumina ratio of greater than about 4.0.

6. The method of claim 1 wherein the carboxylic acid is an alkanoic acid.

7. The method of claim 6 wherein the acid is acetic.

References Cited by the Examiner

UNITED STATES PATENTS

| | | | |
|---|---|---|---|
| 2,398,702 | 4/1946 | Coppock et al. | 260—498 |
| 3,140,322 | 7/1964 | Frilette et al. | 252—455 |

LORRAINE A. WEINBERGER, *Primary Examiner.*

V. GARNER, *Assistant Examiner.*

UNITED STATES PATENT OFFICE
CERTIFICATE OF CORRECTION

Patent No. 3,287,402                        November 22, 1966

Phillip S. Landis

It is hereby certified that error appears in the above numbered patent requiring correction and that the said Letters Patent should read as corrected below.

Column 1, line 19, for "contactor" read -- contacted --; line 64, for "0.9+0.1" read -- 0.9±0.1 --; column 3, line 47, for "XK-5" read -- ZK-5 --; column 3, line 69, for "5 to 20 Oatmospheres" read -- 5 to 200 atmospheres --; line 72, for "aceylene" read -- acetylene --; column 4, line 38, for "pyrocathechol" read -- pyrocatechol --.

Signed and sealed this 12th day of September 1967.

(SEAL)
Attest:

ERNEST W. SWIDER                              EDWARD J. BRENNER
Attesting Officer                                      Commissioner of Patents